(12) United States Patent
Schrattenecker et al.

(10) Patent No.: US 11,828,871 B2
(45) Date of Patent: Nov. 28, 2023

(54) ELECTRONIC DEVICES HAVING SPATIAL RANGING CALIBRATION CAPABILITIES

(71) Applicant: Apple Inc., Cupertino, CA (US)

(72) Inventors: Jochen Schrattenecker, Alberndorf in der Riedmark (AT); Bernhard Sogl, Unterhaching (DE); Andreas Menkhoff, Oberhaching (DE); Joonhoi Hur, Sunnyvale, CA (US); Harald Pretl, Schwertberg (AT); Christian Mayer, Wilhering (AT); Andreas Langer, Unterschleissheim (DE); Rastislav Vazny, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 393 days.

(21) Appl. No.: 17/150,974

(22) Filed: Jan. 15, 2021

(65) Prior Publication Data
US 2022/0229155 A1    Jul. 21, 2022

(51) Int. Cl.
G01S 7/40    (2006.01)

(52) U.S. Cl.
CPC ............. *G01S 7/4056* (2013.01); *G01S 7/40* (2013.01); *G01S 7/4073* (2021.05)

(58) Field of Classification Search
CPC . H04L 27/2614; H04L 1/0026; H04B 17/336; H04B 1/40; H04B 3/487;
(Continued)

(56) References Cited

U.S. PATENT DOCUMENTS

| 5,534,993 A | 7/1996 | Ball et al. |
| 6,313,703 B1 | 11/2001 | Wright et al. |

(Continued)

FOREIGN PATENT DOCUMENTS

| KR | 101169880 B1 | 7/2012 |
| WO | 2019215734 A1 | 11/2019 |

OTHER PUBLICATIONS

Oleg A. Krasnov et al., The PARSAX-full polarimetric FMCW radar with dual-orthogonal signals, 2008 European Radar Conference, Dec. 2008, pp. 84-87, IEEE, Delft, The Netherlands.

(Continued)

*Primary Examiner* — Olumide Ajibade Akonai
(74) *Attorney, Agent, or Firm* — Treyz Law Group, P.C.; Michael H. Lyons

(57) ABSTRACT

An electronic device may include radar circuitry. Control circuitry may calibrate the radar circuitry using a multi-tone calibration signal. A first mixer may upconvert the calibration signal for transmission by a transmit antenna. A de-chirp mixer may mix the calibration signal output by the first mixer with the calibration signal as received by a receive antenna or loopback path to produce a baseband multi-tone calibration signal. The baseband signal will be offset from DC by the frequency gap. This may prevent DC noise or other system effects from interfering with the calibration signal. The control circuitry may sweep the first mixer over the radio frequencies of operation of the radar circuitry to estimate the power droop and phase shift of the radar circuitry based on baseband calibration signal. Distortion circuitry may distort transmit signals used in spatial ranging operations to invert the estimated power droop and phase shift.

20 Claims, 7 Drawing Sheets

(58) Field of Classification Search
CPC ........ H04B 1/04; H04B 17/318; H04B 15/00;
H04B 17/11; H04B 7/0617; H04B 1/02;
H04B 1/1036; H04B 10/07955; H04B
10/50; H04B 3/46; G01S 7/352; G01S
7/4056; G01S 7/40; G01S 7/282; G01S
7/4008; H04W 52/367
See application file for complete search history.

(56) References Cited

U.S. PATENT DOCUMENTS

| | | | |
|---|---|---|---|
| 7,570,201 B1* | 8/2009 | Watkins | G01S 7/4008 |
| | | | 342/174 |
| 7,982,661 B2 | 7/2011 | Beasley | |
| 9,148,234 B2* | 9/2015 | Sundstrom | H04B 17/21 |
| 9,229,102 B1 | 1/2016 | Wright et al. | |
| 9,667,259 B2 | 5/2017 | Goumballa et al. | |
| 9,784,818 B1* | 10/2017 | Doerry | G01S 13/26 |
| 9,952,312 B2 | 4/2018 | Corbett | |
| 10,135,472 B1* | 11/2018 | Ashry Othman | H04B 1/0475 |
| 10,236,898 B2 | 3/2019 | Salle et al. | |
| 10,305,611 B1* | 5/2019 | Rimini | G01S 13/88 |
| 10,389,449 B2 | 8/2019 | Ling et al. | |
| 10,680,664 B2 | 6/2020 | Choi et al. | |
| 11,067,666 B2* | 7/2021 | Cordill | G01S 7/4008 |
| 2009/0273505 A1 | 11/2009 | Pearson et al. | |
| 2013/0058388 A1* | 3/2013 | Muhammad | H04B 15/04 |
| | | | 375/222 |
| 2015/0276918 A1 | 10/2015 | Ramasubramanian et al. | |
| 2016/0282457 A1 | 9/2016 | Mazzaro et al. | |
| 2017/0201275 A1 | 7/2017 | Tabatabai et al. | |
| 2019/0195987 A1 | 6/2019 | Ginsburg | |
| 2019/0271776 A1 | 9/2019 | Davis et al. | |
| 2019/0339358 A1 | 11/2019 | Rimini et al. | |
| 2020/0088870 A1 | 3/2020 | Tsiklauri et al. | |
| 2020/0150260 A1 | 5/2020 | Lang et al. | |
| 2020/0166604 A1 | 5/2020 | Valentine et al. | |
| 2020/0321992 A1 | 10/2020 | Sagi et al. | |
| 2021/0190910 A1* | 6/2021 | Itkin | G01S 13/343 |
| 2022/0173946 A1* | 6/2022 | Wu | H03L 7/23 |

OTHER PUBLICATIONS

Changzhan Gu et al., A Two-Tone Radar Sensor for Concurrent Detection of Absolute Distance and Relative Movement for Gesture Sensing, IEEE Sensors Letters, vol. 1, Issue: 3, Jun. 2017, IEEE.

* cited by examiner

ELECTRONIC DEVICES HAVING SPATIAL RANGING CALIBRATION CAPABILITIES

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is sometimes used to perform spatial ranging operations in which radio-frequency signals are used to estimate a distance between the electronic device and an external object.

It can be challenging to provide wireless circuitry that accurately estimates this distance. For example, the wireless circuitry will often introduce undesirable power droops and/or phase shifts to the radio-frequency signals. If care is not taken, these power droops and phase shifts can cause the wireless circuitry to inaccurately estimate the distance between the electronic device and the external object.

SUMMARY

An electronic device may include wireless circuitry. The wireless circuitry may include spatial ranging circuitry and antennas. In one implementation that is described herein as an example, the spatial ranging circuitry includes radar circuitry such as frequency modulated continuous wave (FMCW) radar circuitry. The antennas may include a transmit antenna for a transmit chain in the radar circuitry and a receive antenna for a receive chain in the radar circuitry. The transmit chain may include a transmit signal generator (e.g., a chirp generator), a digital-to-analog converter (DAC), a first mixer, and a signal splitter. The receive chain may include a second mixer (e.g., a de-chirp mixer) and measurement circuitry. A path (e.g., a de-chirp path) may couple the signal splitter to the second mixer. The transmit signal generator may generate transmit signals (e.g., chirp signals) that are transmitted by the transmit antenna and received by the receive antenna. Doppler shifts in the received signals may be processed to estimate or detect a velocity of an external object. A time-dependent frequency difference between the transmitted and received signals may be processed to estimate or detect a range between the device and the external object. Angle of arrival of the received signals may also be estimated.

If care is not taken, the components of the radar circuitry may impose an undesirable power droop and phase shift to the chirp signals, which can limit the accuracy of the estimated position and/or velocity. Control circuitry may calibrate the radar circuitry to mitigate these issues. During calibration, the DAC may transmit a multi-tone calibration signal. The multi-tone calibration signal includes two or more tones that are separated by a frequency gap. The first mixer may upconvert the multi-tone calibration signal, which is transmitted over the antennas or a loopback path prior to receipt at the second mixer. If desired, an additional mixer may upconvert the multi-tone calibration signal to higher frequencies prior to transmission over the antennas or loopback path and an additional mixer may downconvert the multi-tone calibration signal received over the loopback path or the antennas. The second mixer may mix the multi-tone calibration signal output by the first mixer with the multi-tone calibration signal received over the antennas or loopback path to produce a baseband multi-tone calibration signal. The baseband multi-tone calibration signal will be offset from DC by the frequency gap. This may prevent DC noise, LO leakage, or other system/process noise from interfering with the baseband multi-tone calibration signal.

The control circuitry may sweep the first mixer (or the additional mixers in embodiments where the radar circuitry includes additional mixers) over different frequencies of operation of the radar circuitry while the second mixer continues to generate baseband multi-tone calibration signals. The measurement circuitry may measure magnitudes and phases of the baseband multi-tone calibration signals. The control circuitry may estimate the power droop and phase shift of the radar circuitry based on the magnitude and phase measurements. Distortion circuitry such as predistortion circuitry in the transmit chain may then predistort the transmit signals to invert the power droop and phase shift effects of the radar circuitry, thereby ensuring that accurate range, position, and/or velocity estimates can be obtained over the lifetime of the device.

An aspect of the disclosure provides wireless communication circuitry for performing spatial ranging operations on an external object using transmit signals. The wireless circuitry can include a digital-to-analog converter (DAC) configured to generate a multi-tone calibration signal having a first tone and a second tone separated from the first tone by a frequency gap. The wireless circuitry can include a first mixer configured to upconvert the multi-tone calibration signal from a first frequency band to a second frequency band. The wireless circuitry can include a second mixer having a first input configured to receive the multi-tone calibration signal in the second frequency band via a signal path from an output of the first mixer, and having a second input configured to receive the multi-tone calibration signal in the second frequency band via intermediate circuitry communicatively coupled between the output of the first mixer and the second input. The second mixer can be configured to generate a baseband multi-tone calibration signal. The wireless circuitry can include measurement circuitry configured to measure a magnitude of the baseband multi-tone calibration signal. The wireless circuitry can include control circuitry configured to estimate a power droop of the intermediate circuitry based on the magnitude measured by the measurement circuitry. The control circuitry can be configured to distort the transmit signals based on the estimated power droop.

An aspect of the disclosure provides a method for calibrating radar circuitry. The method can include, with a digital-to-analog converter (DAC) in a transmit chain of the radar circuitry, generating a multi-tone calibration signal having a first tone and a second tone separated from the first tone by a frequency gap of less than 20 MHz. The method can include, with a first mixer in the transmit chain, upconverting the multi-tone calibration signal from baseband to a first frequency band. The method can include, with a second mixer in the transmit chain, upconverting the multi-tone calibration signal from the first frequency band to a second frequency band. The method can include, with a third mixer in a receive chain of the radar circuitry, downconverting the multi-tone calibration signal upconverted by the second mixer from the second frequency band to the first frequency band. The method can include, with a de-chirp mixer in the receive chain, generating a baseband multi-tone calibration signal by mixing the multi-tone calibration signal upconverted by the first mixer with the multi-tone calibration signal downconverted by the third mixer, the baseband multi-tone calibration signal being separated from a direct current (DC) frequency by the frequency gap. The method can include, with control circuitry, estimating a power droop and phase shift of the radar circuitry based on the baseband multi-tone calibration signal generated by the de-chirp mixer. The method can include, with predistortion circuitry in the transmit chain, predistorting chirp signals transmitted over the transmit chain based on the power droop and phase shift estimated by the control circuitry.

An aspect of the disclosure provides an electronic device. The electronic device can include a first antenna. The electronic device can include a second antenna. The electronic device can include radar circuitry configured to generate transmit signals that are transmitted using the first antenna. The second antenna can be configured to receive a reflected version of the transmit signals transmitted using the first antenna. The electronic device can include control circuitry configured to perform spatial ranging operations based on the reflected version of the transmit signals received using the second antenna. The electronic device can include a digital-to-analog converter (DAC) in the radar circuitry. The DAC can be configured to generate a multi-tone calibration signal that is transmitted using the first antenna. The multi-tone calibration signal can have a first tone and a second tone that is separated from the first tone by a frequency gap of less than 20 MHz. The control circuitry can be configured to estimate a power droop of the radar circuitry using the multi-tone calibration signal. The control circuitry can be configured to distort the transmit signals based on the estimated power droop.

DETAILED DESCRIPTION

Figure 1:
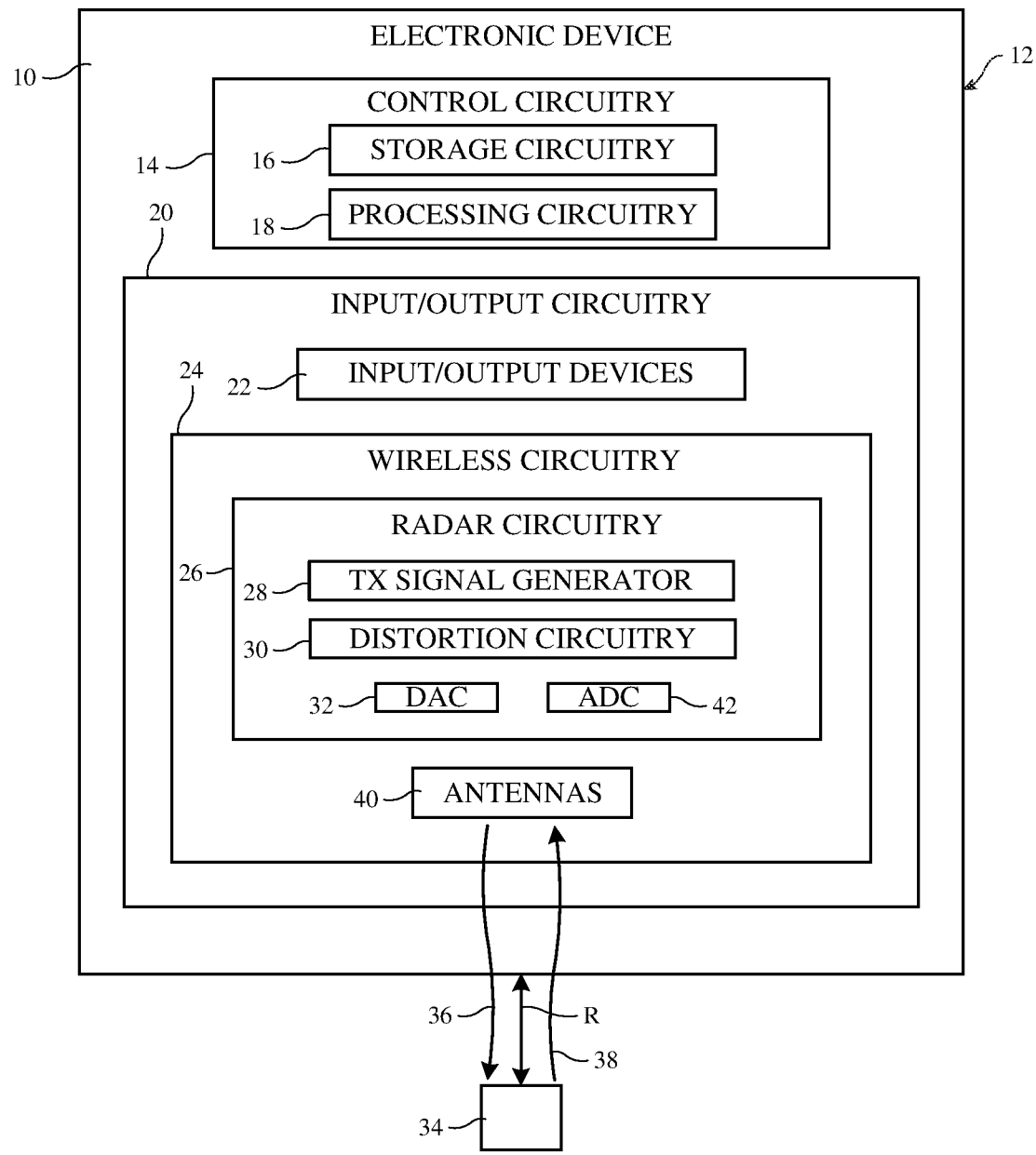
FIG. 1 is a functional block diagram of an illustrative electronic device having calibrated spatial ranging circuitry in accordance with some embodiments.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 5G protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include two or more antennas 40. Wireless circuitry 24 may also include baseband processor circuitry, transceiver circuitry, amplifier circuitry, filter circuitry, switching circuitry, radio-frequency transmission lines, and/or any other circuitry for transmitting and/or receiving radio-frequency signals using antennas 40.

Wireless circuitry 24 may transmit and/or receive radio-frequency signals within a corresponding frequency band at radio frequencies (sometimes referred to herein as a communications band or simply as a "band"). The frequency bands handled by wireless circuitry 24 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Antennas 40 may be formed using any desired antenna structures. For example, antennas 40 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antennas 40 over time.

The radio-frequency signals handled by antennas 40 may be used to convey wireless communications data between device 10 and external wireless communications equipment (e.g., one or more other devices such as device 10). Wireless communications data may be conveyed by wireless circuitry 24 bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

Wireless circuitry 24 may additionally or alternatively perform spatial ranging operations using antennas 40. In scenarios where wireless circuitry 24 both conveys wireless communications data and performs spatial ranging operations, one or more of the same antennas 40 may be used to both convey wireless communications data and perform spatial ranging operations. In another implementation, wireless circuitry 24 may include a set of antennas 40 that only conveys wireless communications data and a set of antennas 40 that is only used to perform spatial ranging operations.

When performing spatial ranging operations, antennas 40 may transmit radio-frequency signals 36. Wireless circuitry 24 may transmit radio-frequency signals 36 in a corresponding radio frequency band such (e.g., a frequency band that includes frequencies greater than around 10 GHz, greater than around 20 GHz, less than 10 GHz, etc.). Radio-frequency signals 36 may reflect off of objects external to device 10 such as external object 34. External object 34 may be, for example, the ground, a building, a wall, furniture, a ceiling, a person, a body part, an animal, a vehicle, a landscape or geographic feature, an obstacle, or any other object or entity that is external to device 10. Antennas 40 may receive reflected radio-frequency signals 38. Reflected signals 38 may be a reflected version of the transmitted radio-frequency signals 36 that have reflected off of external object 34 and back towards device 10.

Control circuitry 14 may process the transmitted radio-frequency signals 36 and the received reflected signals 38 to detect or estimate the range R between device 10 and external object 34. If desired, control circuitry 14 may also process the transmitted and received signals to identify a two or three-dimensional spatial location (position) of external object 34, a velocity of external object 34, and/or an angle of arrival of reflected signals 38. In one implementation that is described herein as an example, wireless circuitry 24 performs spatial ranging operations using a frequency-modulated continuous-wave (FMCW) radar scheme. This is merely illustrative and, in general, other radar schemes or spatial ranging schemes may be used (e.g., an OFDM radar scheme, an FSCW radar scheme, a phase coded radar scheme, etc.).

In order to support spatial ranging operations, wireless circuitry 24 may include spatial ranging circuitry such as radar circuitry 26. In one embodiment that is sometimes described herein as an example, radar circuitry 26 includes FMCW radar circuitry that performs spatial ranging using an FMCW radar scheme. Radar circuitry 26 may therefore sometimes be referred to herein as FMCW radar circuitry 26. Radar circuitry 26 may use one or more antennas 40 to transmit radio-frequency signals 36 (e.g., as a continuous wave of radio-frequency energy under an FMCW radar scheme). One or more antennas 40 may also receive reflected signals 38 (e.g., as a continuous wave of radio-frequency energy under the FMCW radar scheme). Radar circuitry 26 may process radio-frequency signals 36 and reflected signals 38 to identify/estimate range R, the position of external object 34, the velocity of external object 34, and/or the angle-of-arrival of reflected signals 38. In embodiments where radar circuitry 26 uses an FMCW radar scheme, doppler shifts in the continuous wave signals may be detected and processed to identify the velocity of external object 34 and the time dependent frequency difference between radio-frequency signals 36 and reflected signals 38 may be detected and processed to identify range R and/or the position of external object 34. Use of continuous wave signals for estimating range R may allow control circuitry 10 to reliably distinguish between external object 34 and other background or slower-moving objects, for example.

As shown in FIG. 1, radar circuitry 26 may include transmit (TX) signal generator circuitry such as transmit signal generator 28. Transmit signal generator 28 may generate transmit signals for transmission over antenna(s) 40. In some implementations that are described herein as an example, transmit signal generator 28 includes a chirp generator that generates chirp signals for transmission over antenna(s) 40 (e.g., in embodiments where radar circuitry 26 uses an FMCW radar scheme). Transmit signal generator 28 may therefore sometimes be referred to herein as chirp generator 28. Transmit signal generator 28 may, for example, produce chirp signals that are transmitted as a continuous wave of radio-frequency signals 36. The chirp signals may be formed by periodically ramping up the frequency of the transmitted signals in a linear manner over time, for example. Radar circuitry 26 may also include digital-to-analog converter (DAC) circuitry such as DAC 32. DAC 32 may convert the transmit signals (e.g., the chirp signals) from the digital domain to the analog domain prior to transmission by antennas 40 (e.g., in radio-frequency signals 36). Radar circuitry 26 may also include analog-to-digital converter (ADC) circuitry such as ADC 42. ADC 42 may convert signals from the analog domain to the digital domain for subsequent processing by control circuitry 14. While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24).

In practice, the components in wireless circuitry 24 may introduce a frequency-dependent power droop and/or a phase shift to the radio-frequency signals transmitted by antennas 40. The power droop may, for example, be caused by circuit, filter, and/or cabling frequency dependencies, as well as by directivity/gain limitations over frequency for antennas 40. When using an FMCW radar scheme, the frequency-dependent power droop increases the width of the main target lobe in the baseband (BB) spectrum, which can reduce the range resolution of radar circuitry 26. In addition, signal-to-noise ratio (SNR) in the baseband signal can be reduced due to discrete and fixed gain stages in wireless circuitry 24. It may therefore be desirable to be able to avoid or compensate for any power droop or phase shift introduced by wireless circuitry 24 when performing spatial ranging operations.

In order to compensate for the power droop and phase shift introduced by wireless circuitry 24 while performing spatial ranging operations, wireless circuitry 24 may estimate or track the power droop and phase shift introduced by wireless circuitry 24 during operation over the lifetime of device 10. DAC 32 may generate a multi-tone calibration signal that is used to estimate the power droop and phase shift. The multi-tone calibration signal includes two or more tones that are separated by a relatively small gap in frequency space (sometimes referred to herein as frequency gap $\Delta f$). Once the power droop and/or phase shift have been estimated, radar circuitry 26 may distort the transmit signals (e.g., chirp signals) generated by transmit signal generator 28 using distortion circuitry 30. Distortion circuitry 30 may include predistortion circuitry that predistorts the transmit signals prior to transmission by antennas 40 and/or may include post-distortion circuitry that distorts received signals. The distortion introduced by distortion circuitry 30 may serve to invert the effects of the power droop and phase shift, thereby ensuring that radar circuitry 26 can continue to produce accurate estimates of range R, position, velocity, and/or angle-of-arrival, even if the power droop or phase shift change over time. Distortion circuitry 30 may be implemented using hardware and/or software on control circuitry 14, using one or more processors in radar circuitry 26 and/or control circuitry 14, using digital logic on radar circuitry 26 (e.g., a standalone digital predistortion circuit block), using analog circuitry in radar circuitry 26 (e.g., a standalone analog predistortion circuit block), etc. The distortion circuitry may include, for example, multipliers, look-up tables, memory, and/or any other desired components for distorting an input signal to produce a distorted output signal (e.g., a predistorted output signal in embodiments where distortion circuitry 30 includes predistortion circuitry).

Figure 2:
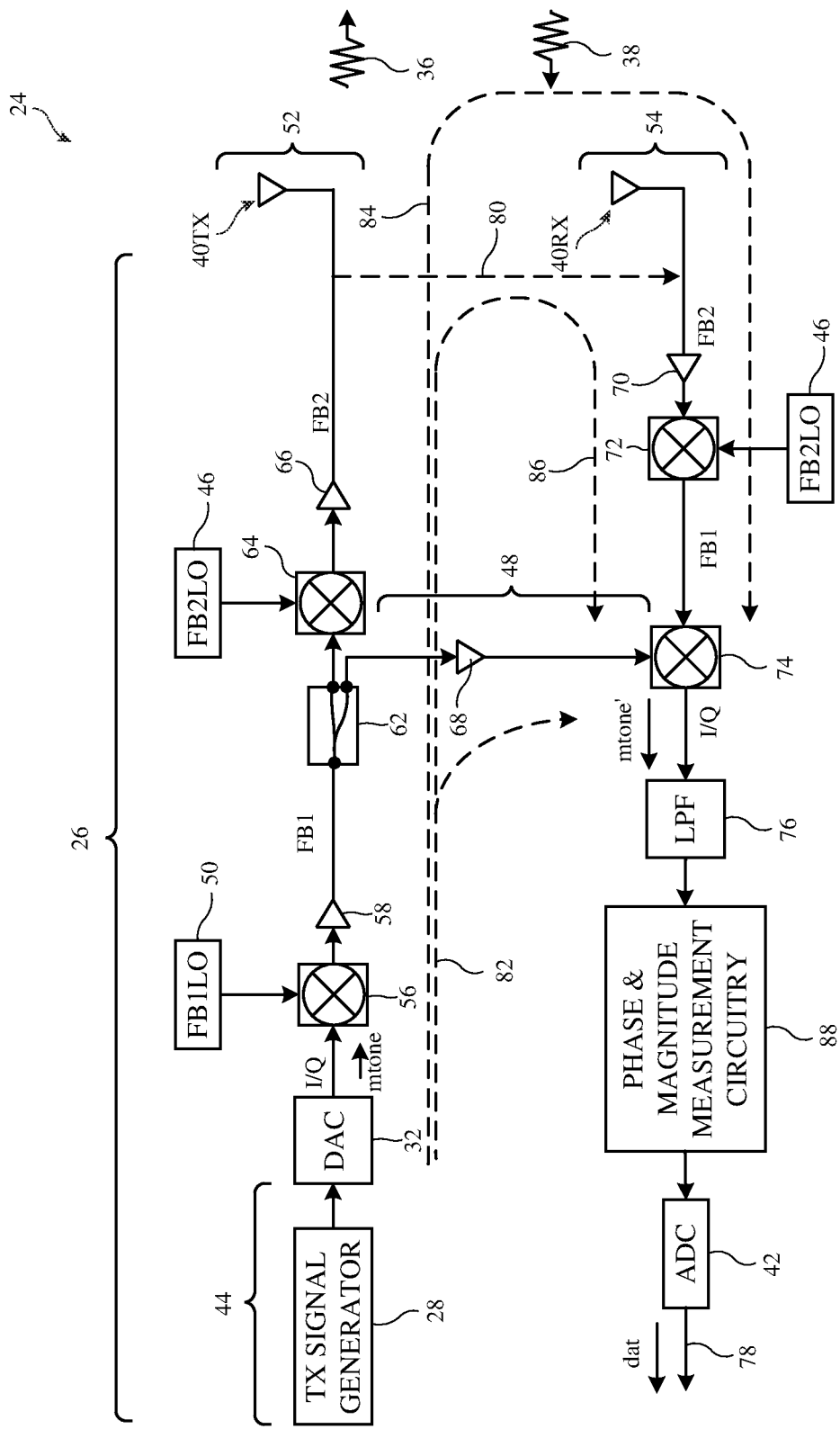
FIG. 2 is a circuit diagram of illustrative spatial ranging circuitry that is calibrated using a multi-tone calibration signal in accordance with some embodiments.

FIG. 2 is a circuit diagram of radar circuitry 26 (e.g., in embodiments where radar circuitry 26 performs multiple up-conversions prior to transmission by antennas 40). If desired, the components of radar circuitry 26 may be mounted to a common substrate (e.g., a shared rigid or flexible printed circuit board) or may be formed on a common integrated circuit (IC) or package. As shown in FIG. 2, radar circuitry 26 may include a transmit chain 52 (sometimes referred to herein as transmitter chain 52, transmit line-up 52, or transmit path 52) and a receive chain 54 (sometimes referred to herein as receiver chain 54, receive line-up 54, or receive path 52).

Radar circuitry 26 may have a first (transmit) port coupled to a first antenna 40 such as transmit antenna 40TX (e.g., transmit antenna 40TX may form a part of transmit chain 52). Radar circuitry 26 may have a second (receive) port coupled to a second antenna 40 such as receive antenna 40RX (e.g., receive antenna 40RX may form a part of receive chain 54). A signal path such as de-chirp path 48 may couple transmit chain 52 to receive chain 54.

Transmit chain 52 may include transmit signal generator 28 (e.g., a chirp generator), DAC 32, an first mixer such as mixer 56, amplifier circuitry such as amplifiers 58 and 66 (e.g., power amplifiers), a signal splitter such as splitter 62, and a second radio-frequency mixer such as mixer 64. Receive chain 54 may include ADC 42, phase and magnitude measurement circuitry 88, filter circuitry such as low pass filter (LPF) 76, a third mixer such as de-chirp mixer 74, a fourth mixer such as mixer 72, and amplifier circuitry such as amplifier 70 (e.g., a low noise amplifier (LNA)).

As shown in FIG. 2, the output of transmit signal generator 28 may be coupled to the input of DAC 32 (e.g., transmit signal generator 28 may be formed from digital logic in radar circuitry 26 and may operate in the digital domain). The output of DAC 32 may be coupled to a first input of mixer 56 (e.g., over an I/Q signal path). Mixer 56 may have a second input that receives a local oscillator (LO) signal from frequency band 1 local oscillator (FB1LO) 50. The output of mixer 56 may be coupled to the input of amplifier 58. The output of amplifier 58 may be coupled to the input of splitter 62. Splitter 62 may have a first output terminal coupled to a first input of mixer 64. Mixer 64 may have a second input that receives a LO signal from frequency band 2 local oscillator (FB2LO) 46. The output of mixer 64 may be coupled to the input of amplifier 66. The output of amplifier 66 may be coupled to transmit antenna 40TX (e.g., over one or more radio-frequency transmission lines).

In receive chain 54, the input of amplifier 70 may be coupled to receive antenna 40RX. The output of amplifier 70 may be coupled to a first input of mixer 72. Mixer 72 may have a second input that receives the LO signal from FB2LO 46. The output of mixer 72 may be coupled to a first input of de-chirp mixer 74. De-chirp mixer 74 may have a second input that is coupled to a second output terminal of splitter 62 over de-chirp path 48. If desired, an amplifier such as amplifier 68 may be interposed on de-chirp path 48. While not shown in the example of FIG. 2 for the sake of clarity, de-chirp path 48 may also include a signal splitter having first and second output terminals coupled to de-chirp mixer 74, where a 90-degree phase delay is applied to the second output terminal (e.g., so de-chirp mixer 74 can operate on I/Q signals). The output of de-chirp mixer 74 may be coupled to the input of LPF 76 (e.g., over an I/Q signal path). The output of LPF 76 may be coupled to the input of phase and magnitude measurement circuitry 88. The output of phase and magnitude measurement circuitry 88 may be coupled to the input of ADC 42. The output of ADC 42 may be coupled to control circuitry 14 (FIG. 1) over digital output path 78. If desired, an optional loopback path 80 may couple the output of amplifier 66 in transmit chain 52 to the input of amplifier 70 in receive chain 54. A radio-frequency coupler and/or switching circuitry may be interposed on loopback path 80 if desired. Loopback path 80 may be used to calibrate radar circuitry 26 in scenarios where antennas 40TX and 40RX are not used for calibration.

Transmission lines in wireless circuitry 24 (e.g., radio-frequency transmission lines used to couple mixer 64 to transmit antenna 40TX, radio-frequency transmission lines used to couple receive antenna 40RX to mixer 72, etc.) may include coaxial cables, microstrip transmission lines, stripline transmission lines, edge-coupled microstrip transmission lines, edge-coupled stripline transmission lines, transmission lines formed from combinations of transmission lines of these types, etc. One or more of the transmission lines may be integrated into rigid and/or flexible printed circuit boards if desired.

The example of FIG. 2 is merely illustrative. In general, other circuit architectures may be used to form radar circuitry 26. Mixers 56 and 74 may be I/Q mixers. Additional filters, amplifiers, switches, delay stages, splitters, and/or other circuit components may be formed at other locations in radar circuitry 26. For example, a bandpass filter may be interposed between amplifier 58 and splitter 62. Phase and magnitude measurement circuitry 88 may be formed at other locations or at multiple locations if desired (e.g., measurement circuitry 88 may be coupled to the output ADC 42, the input of ADC 42, and/or the input of LPF 76). If desired, mixers 64 and 72 and FB2LO 46 may be omitted. De-chirp mixer 74 may operate in the digital domain if desired (e.g., the output of ADC 42 may be coupled to the input of de-chirp mixer 74, ADC 42 may be interposed on receive chain 54 at any desired location between receive antenna 40RX and the input of de-chirp mixer 74, etc.). Digital predistortion circuitry and/or analog predistortion circuitry from distortion circuitry 30 of FIG. 1 may be interposed on transmit chain 52 and/or receive chain 54 at any desired location(s). In addition to being used to perform spatial ranging operations for radar circuitry 26, transmit antenna 40TX and/or receive antenna 40RX may also be used to transmit and/or receive wireless communications data if desired (e.g., using other transceiver circuitry and frequency/time domain multiplexing circuitry not shown in FIG. 2 for the sake of clarity). Radar circuitry 26 may, for example, form part of a transmitter such as a 5G NR transmitter.

When performing spatial ranging operations, transmit signal generator 28 may generate digital transmit signals (e.g., digital chirp signals) for subsequent transmission by transmit antenna 40TX (e.g., using a continuous wave of radio-frequency energy). DAC 32 may convert the digital transmit signals into corresponding analog transmit signals (e.g., analog chirp signals). DAC 32 may provide the analog transmit signals (e.g., as I/Q signals) to mixer 56. Mixer 56 may upconvert the analog transmit signals from baseband to a first frequency band FB1 band using FB1LO 50.

First frequency band FB1 may be at higher frequencies than baseband and lower frequencies than the radio-frequency signals 36 transmitted by transmit antenna 40TX (e.g., in the arrangement of FIG. 2 in which multiple up-conversions are performed). As one example, radio-frequency signals 36 may be transmitted in a second frequency band FB2 such as a radio-frequency (RF) band. Frequency band FB2 may include frequencies greater than 10 GHz (e.g., an RF band around 25 GHz, greater than 20 GHz, greater than 30 GHz, greater than 50 GHz, etc.) and/or frequencies less than 10 GHz. Frequency band FB1 may include frequencies less than frequency band FB2 (e.g., frequencies less than 10 GHz, less than 5 GHz, etc.). Frequency band FB1 may sometimes be referred to herein as an intermediate frequency (IF) band. In embodiments where mixers 64 and 72 are omitted, frequency band FB1 may be any desired frequency band (e.g., an RF band) higher than baseband.

Amplifier 58 may amplify the FB1 transmit signals (e.g., FB1 chirp signals) for transmission to splitter 62. Distributing the transmit signals in frequency band FB1 rather than in the higher frequency band FB2 may serve to minimize signal attenuation as the signals are distributed to locations in device 10 that are relatively far away from DAC 32, particularly when frequency band FB2 is at relatively high frequencies that are otherwise subject to significant signal attenuation (e.g., frequencies greater than 10 GHz). Splitter 62 may transmit the FB1 transmit signals to mixer 64 and de-chirp path 48 (e.g., splitter 62 may split the FB1 transmit signals between mixer 64 and de-chirp path 48). Mixer 64 may upconvert the FB1 transmit signals from frequency band FB1 to frequency band FB2 for transmission by transmit antenna 40TX. Amplifier 66 may amplify the FB2 transmit signals (e.g., FB2 chirp signals) and transmit antenna 40TX may transmit the FB2 transmit signals (e.g., as radio-frequency signals 36). In embodiments where mixers 64 and 72 are omitted, transmit antenna 40TX may transmit the FB1 transmit signals as radio-frequency signals 36.

Receive antenna 40RX may receive reflected signals 38 (e.g., a reflected version of the FB2 transmit signals transmitted by transmit antenna 40TX but that have reflected off of external object 34 of FIG. 1). In examples where the transmit signals include chirp signals, reflected signals 38 may sometimes be referred to herein as reflected chirp signals. Amplifier 70 may amplify the reflected signals. Mixer 72 may downconvert the reflected signals from frequency band FB2 to frequency band FB1 for distribution to de-chirp mixer 74 (e.g., as FB1 reflected signals). De-chirp path 48 may convey the FB1 transmit signals from splitter 62 to de-chirp mixer 74. Amplifier 68 may amplify the FB1 transmit signals on de-chirp path 48 (e.g., to compensate for attenuation associated with splitter 62). De-chirp mixer 74 may mix the FB1 transmit signals received over de-chirp path 48 with the FB1 reflected signals received from mixer 72 to produce baseband signals (e.g., baseband chirp signals). In embodiments where mixers 64 and 72 are omitted, de-chirp mixer 74 may mix the FB1 transmit signals received over de-chirp path 48 with the FB1 reflected signals received by receive antenna 40RX. De-chirp mixer 74 may provide the baseband signals to LPF 76. LPF 76 may low-pass filter the baseband signals to remove noise, harmonic effects, etc. The baseband signals may be conveyed to ADC 42 (e.g., via phase and magnitude measurement circuitry 88). ADC 42 may convert the baseband signals to digital signals (e.g., digital chirp signals). Control circuitry 14 may process the baseband signals to estimate range R, the position of external object 34, and/or the velocity of external object 34 (FIG. 1).

In practice, transmit antenna 40TX, receive antenna 40RX, the transmission lines, filter circuitry (which typically cannot support the full FMCW bandwidth), and the other components in transmit chain 52 and receive chain 54 can introduce an undesirable power droop and/or phase shift to radar circuitry 26. For example, the components along dashed path 82 may introduce a power droop and/or phase shift to the signals provided to de-chirp mixer 74, which can be characterized by complex weight values $k_1$ and $k_3$. Similarly, the components along dashed path 84 (or dashed path 86 in scenarios where loopback path 80 is used for calibration rather than antennas 40TX and 40RX) may introduce a power droop and/or phase shift to the signals provided to de-chirp mixer 74, which can be characterized by complex weight values $k_2$ and $k_4$.

If care is not taken, the power droop and phase shift may cause control circuitry 14 to generate inaccurate estimates of range R, position, and/or velocity. In addition, the amount of power droop and phase shift can change over time. Control circuitry 14 and radar circuitry 26 may perform calibration operations to estimate the power droop and phase shift and to compensate for the estimated power droop and phase shift even if the power droop and phase shift change over time, thereby ensuring that control circuitry 14 can accurately estimate range R and the position/velocity of external objects throughout the useful life of device 10.

However, in practice, the presence of de-chirp path 48, the relatively low baseband bandwidth of the system after de-chirping (e.g., 1-10 MHz) given the relatively high RF bandwidth of the system (e.g., 3-5 GHz), and the presence of DC/flicker noise or other process noise (e.g., LO leakage) at baseband can make it particularly difficult to estimate the power droop and/or phase shift of radar circuitry 26. In order to mitigate these issues and to ensure that accurate estimates of the power droop and phase shift are gathered, radar circuitry 26 may be calibrated using a multi-tone calibration signal. The multi-tone calibration signal may include two or more tones (e.g., two tones, three tones, four tones, five tones, six tones, more than six tones, etc.) that are separated by a relatively small frequency gap $\Delta f$ in frequency space.

As shown in FIG. 2, during the calibration operations, DAC 32 may generate multi-tone calibration signal mtone at baseband frequencies. Transmit signal generator 28 may refrain from transmitting signals (e.g., chirp signals) during the calibration operations. Mixer 56 may upconvert multi-tone calibration signal mtone to frequency band FB1 using FB1LO 50. Amplifier 58 may amplify and transmit multi-tone calibration signal mtone. Splitter 62 may provide multi-tone calibration signal mtone to mixer 64. Splitter 62 may also provide multi-tone calibration signal mtone to de-chirp mixer 74 over de-chirp path 48. Mixer 64 may upconvert multi-tone calibration signal mtone to frequency band FB2, amplifier 66 may amplify multi-tone calibration signal mtone, and transmit antenna 40TX may transmit multi-tone calibration signal mtone.

Receive antenna 40RX may receive the multi-tone calibration signal mtone transmitted by transmit antenna 40TX (e.g., directly over-the-air in a closed-loop path). In another implementation, loopback path 80 may be used to convey multi-tone calibration signal mtone from the output of amplifier 66 to the input of amplifier 70. In this example, transmit antenna 40TX is not used to transmit the multi-tone calibration signal. Amplifier 70 may amplify the multi-tone calibration signal mtone received using receive antenna 40RX or loopback path 80.

Mixer 72 may downconvert the received multi-tone calibration signal mtone to frequency band FB1 using FB2LO 46. De-chirp mixer 74 may mix the multi-tone calibration signal mtone in frequency band FB1 received over de-chirp path 48 with the multi-tone calibration signal mtone in frequency band FB1 received from mixer 72 to produce baseband multi-tone calibration signal mtone'. LPF 76 may filter baseband multi-tone calibration signal mtone' to remove high frequency mixer products from the baseband multi-tone calibration signal. Phase and magnitude measurement circuitry 88 may measure the magnitude and/or phase of baseband multi-tone calibration signal mtone' and may provide the measured magnitude and/or phase values to ADC 42. ADC 42 may convert the magnitude and/or phase values into digital data dat. Digital data dat may be provided to control circuitry 14 over digital output path 78. Control circuitry 14 may store digital data dat at storage circuitry 16 for subsequent processing. This example is merely illustrative and, if desired, phase and magnitude measurement circuitry 88 may be located at other points or multiple points within receive chain 54.

This process may be repeated while sweeping over different frequency bands FB2 (e.g., while changing the radio frequency of multi-tone calibration signal mtone as produced by mixer 64). This may serve to produce a full estimate of the power droop and/or phase shift of FMCW radar circuitry 26 across the operating (radio) frequencies of radar circuitry 26. Once each of the desired radio frequencies have been characterized, distortion circuitry 30 (FIG. 1) may distort subsequently-transmitted transmit signals (e.g., chirp signals) to invert the estimated power droop and/or phase shifts as estimated using multi-tone calibration signal mtone. The distorted chirp signals may then be used to produce accurate and reliable estimates of range R, velocity, and/or position.

Figure 3:
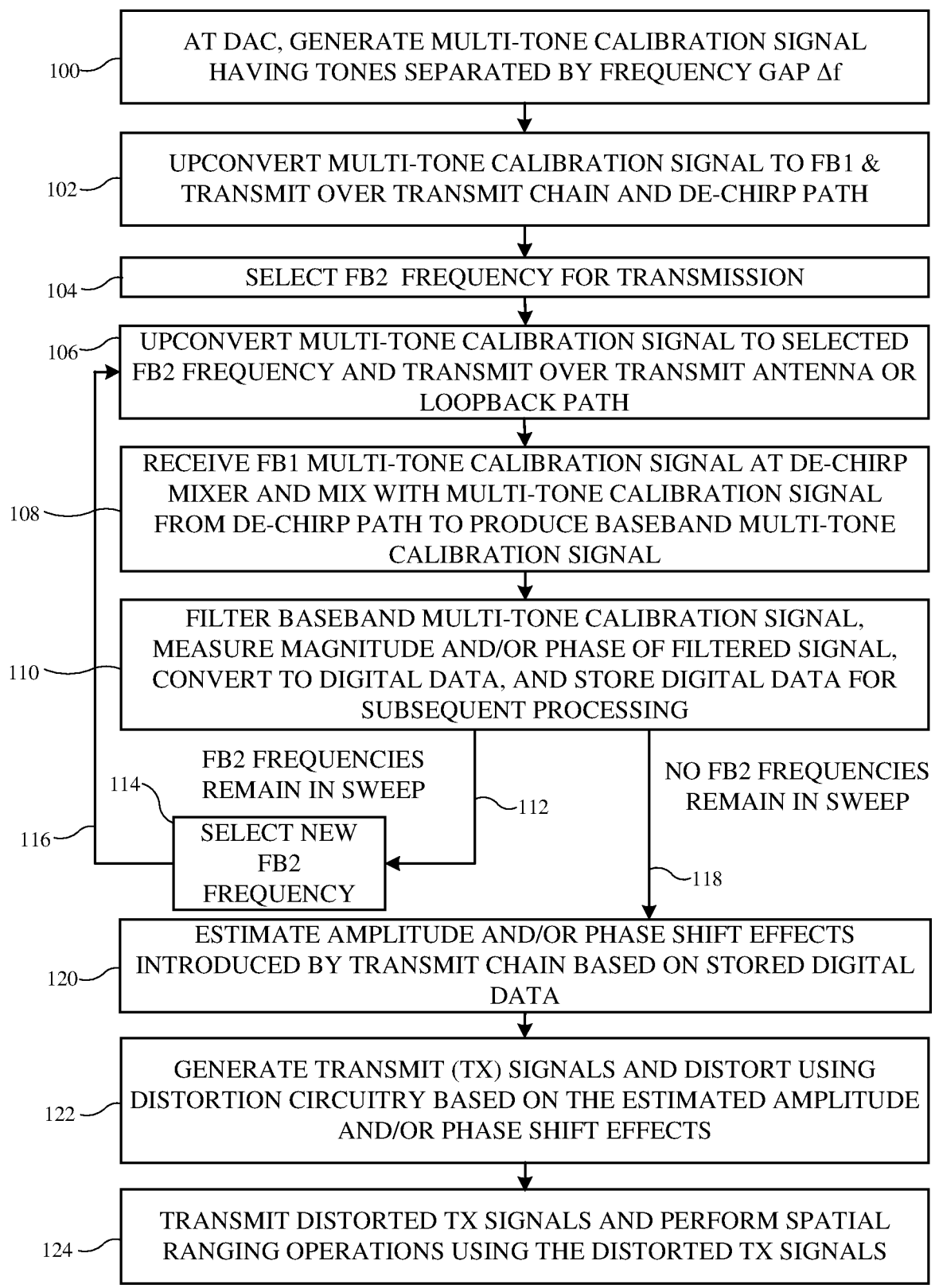
FIG. 3 is flow chart of illustrative operations involved in calibrating spatial ranging circuitry using a multi-tone calibration signal in accordance with some embodiments.

FIG. 3 is a flow chart of illustrative operations that may be performed by radar circuitry 26 and control circuitry 14 in calibrating radar circuitry 26 (e.g., in embodiments where radar circuitry 26 performs multiple up-conversions prior to transmission by antennas 40). The operations of FIG. 3 may be performed during manufacture, assembly, or testing of radar circuitry 26 or device 10 (e.g., in a manufacturing system or factory) and/or may be performed during regular operation of device 10 by an end user (e.g., during the useful life of device 10).

At operation 100, DAC 32 may generate multi-tone calibration signal mtone. DAC 32 may generate the multi-tone calibration signal such that each tone is separated from one or two adjacent tones (in frequency) by a selected frequency gap $\Delta f$. Frequency gap $\Delta f$ may be large enough so that each tone is distinct in frequency but small enough so that each tone experiences approximately the same power droop and so that frequency gap $\Delta f$ lies within the relatively small bandwidth of ADC 42. As examples, frequency gap $\Delta f$ may be 20 MHz, 15 MHz, 10 MHz, 9 MHz, 8 MHz, 7 MHz, 6 MHz, 5 MHz, 4 MHz, 3 MHz, 2 MHz, less than 20 MHz, less than 15 MHz, less than 10 MHz, less than 7 MHz, less than 6 MHz, less than 5 MHz, less than 4 MHz, or other values.

At operation 102, mixer 56 may upconvert multi-tone calibration signal mtone from baseband to frequency band FB1. Amplifier 58 may pass multi-tone calibration signal mtone in frequency band FB1 to splitter 62. Splitter 62 may transmit multi-tone calibration signal mtone to de-chirp mixer 74 over de-chirp path 48. Splitter 62 may also transmit multi-tone calibration signal mtone to mixer 64.

At operation 104, control circuitry 14 may select a first FB2 frequency (e.g., a first RF band) to use for transmitting multi-tone calibration signal mtone. The frequency may be the first frequency in a sweep over the operating radio frequencies of radar circuitry 26 that is performed in calibrating the radar circuitry. The frequency may be greater than 10 GHz or 20 GHz or less than 10 GHz, as examples.

At operation 106, mixer 64 may upconvert multi-tone calibration signal mtone from frequency band FB1 to the selected FB2 frequency (e.g., using FB2LO 46). Amplifier 66 may amplify the radio-frequency multi-tone calibration signal mtone. Transmit antenna 40TX may transmit the radio-frequency multi-tone calibration signal mtone and receive antenna 40RX may receive the transmitted radio-frequency multi-tone calibration signal mtone. In time, the transmit antenna transmits each of the tones in the radio-frequency multi-tone calibration signal mtone concurrently and, if desired, with the same polarization. In another implementation, the radio-frequency multi-tone calibration signal mtone may be conveyed to receive chain 54 over loopback path 80 rather than being transmitted by transmit antenna 40TX.

At operation 108, de-chirp mixer 74 may receive the multi-tone calibration signal mtone in frequency band FB2 over de-chirp path 48. Mixer 72 may downconvert the radio-frequency multi-tone calibration signal mtone received over receive antenna 40RX or loopback path 80 to frequency band FB1. De-chirp mixer 74 may mix the multi-tone calibration signal mtone in frequency band FB1 received over de-chirp path 48 with the multi-tone calibration signal mtone in frequency band FB1 produced by mixer 72 to generate baseband multi-tone calibration signal mtone'.

At operation 110, LPF 76 may filter baseband multi-tone calibration signal mtone' to remove high frequency mixer products from the baseband multi-tone calibration signal. Phase and magnitude measurement circuitry 88 may measure the magnitude and/or phase of baseband multi-tone calibration signal mtone'. In scenarios where a single tone is used for calibration, the single tone after down-conversion by de-chirp mixer 74 is at DC and is subject to interference from DC noise and other LO leakage. However, in scenarios where multi-tone calibration signal mtone is used for calibration, each of the tones in baseband multi-tone calibration signal mtone' is offset from DC by frequency gap $\Delta f$. This may serve to prevent DC/flicker noise or other process noise (e.g., LO leakage) at baseband from interfering with baseband multi-tone calibration signal mtone', thereby allowing for a more accurate estimate of power droop and/or phase shift to be obtained than in scenarios where only a single tone is used for calibration. ADC 42 may convert the magnitude and phase values to corresponding digital data dat. Control circuitry 14 may store digital data dat for subsequent processing.

If frequencies remain in the sweep of FB2 frequencies for estimating the power droop and phase shift, processing may proceed to operation 114 as shown by path 112. At operation 114, control circuitry 14 may select a new FB2 frequency to use for the next transmission of multi-tone calibration signal mtone. Processing may then loop back to operation 106, as shown by path 116, to continue to gather magnitude and/or phase values from baseband multi-tone calibration signal mtone for each of the FB2 frequencies in the sweep. This may allow control circuitry 14 to gather a full estimate of the power droop and/or phase of FMCW radar circuitry 26 as a function of frequency (e.g., across the range of operating frequencies of radar circuitry 26) for use in distorting subsequently transmitted chirp signals.

If no frequencies remain in the sweep of FB2 frequencies for estimating the power droop and phase shift, processing may proceed to operation 120 via path 118. At operation 120, control circuitry 14 may process the digital data dat (e.g., as stored at each iteration of operations 106-110) to estimate the amplitude and/or phase shift effects introduced by the components of radar circuitry 26. The amplitude effects may be indicative of the power droop of the system.

At operation 122, radar circuitry 26 may resume transmission of transmit signals for determining the range R between device 10 and external object 34 (FIG. 1). Transmit signal generator 28 may transmit signals (e.g., chirp signals). Control circuitry 14 may predistort and/or post-distort the signals using distortion circuitry 30. Distortion circuitry 30 (FIG. 1) may distort the signals based on the estimated power droop and/or phase shift effects (e.g., as identified at operation 120). Distortion circuitry 30 may include digital predistortion circuitry that predistorts the chirp signals in the digital domain prior to conversion by DAC 32, analog predistortion circuitry that predistorts the chirp signals after conversion by DAC 32, and/or post-distortion circuitry that distorts received signals.

At operation 124, transmit antenna 40TX may radiate the transmit signals. Receive antenna 40RX may receive a reflected version of the transmitted signals that have reflected off of external object 34 (e.g., as reflected signals 38 of FIG. 1). The distortion performed at operation 124 may be an inverse of the estimated power droop and/or phase shift effects such that, after passing through transmit chain 52, the distorted chirp signals are transmitted by transmit antenna 40TX and received by receive antenna 40RX as if there was no power droop or phase shift introduced by radar circuitry 26. Distortion circuitry 30 may perform the distortion by complex-multiplying the transmit signals by complex values that serve to invert the estimated power droop and/or phase shift, as well as any I/Q imbalance in the system, for example.

If desired, radar circuitry 26 and control circuitry 14 may re-calibrate radar circuitry 26 (e.g., by looping back to operation 100) periodically (e.g., after a predetermined time period has elapsed), upon receipt of a user input or application call instructing device 10 to calibrate radar circuitry 26, upon a detected change in the operating conditions of device 10, upon detection of deterioration in the wireless performance of device 10, or in response to any other desired trigger condition. This may allow radar circuitry 26 to continue to generate accurate estimates of range R, position, and velocity throughout the operating life of device 10. In another implementation, radar circuitry 26 may be calibrated only once.

Figure 4:
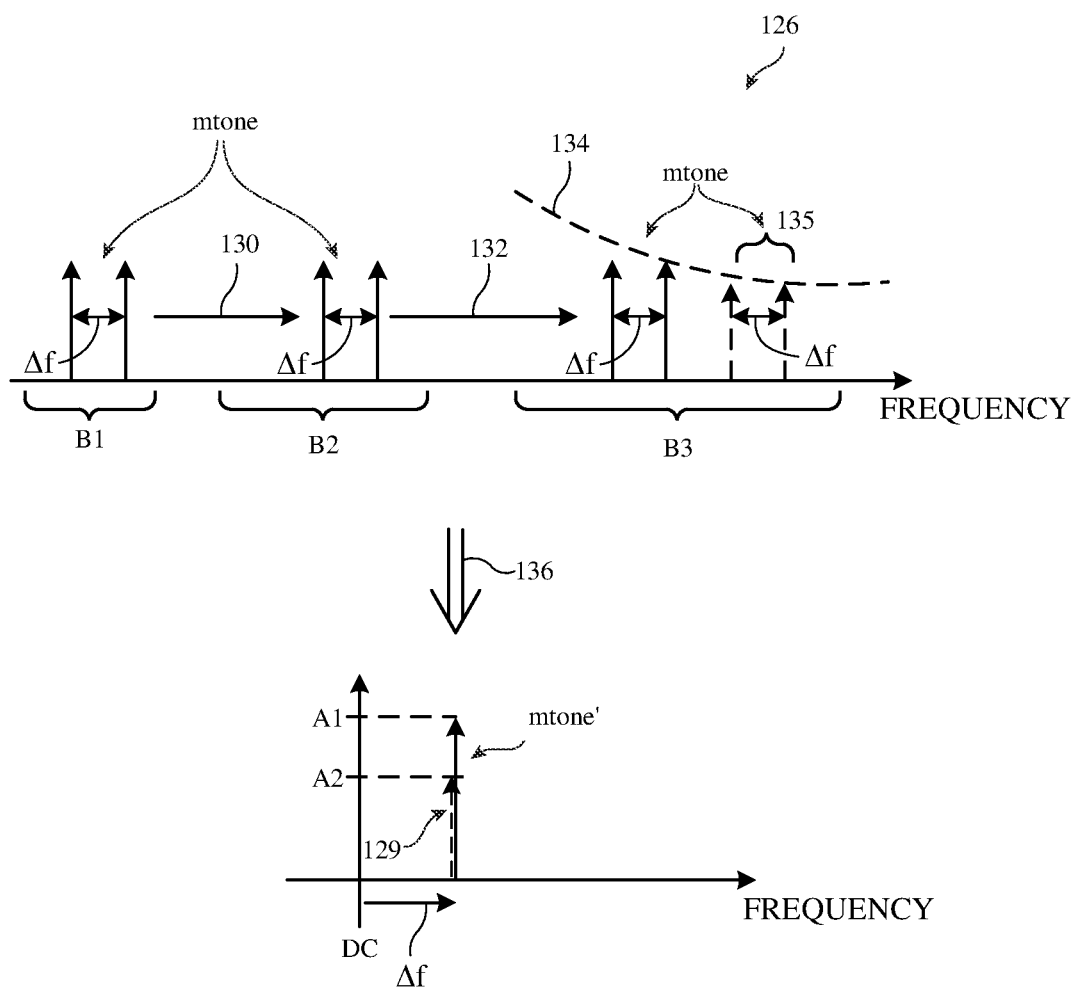
FIG. 4 is a frequency diagram of an illustrative multi-tone calibration signal that may be used to estimate the power droop and/or phase shift of spatial ranging circuitry in accordance with some embodiments.

FIG. 4 includes frequency diagrams that show how an exemplary multi-tone calibration signal mtone may be used to produce baseband multi-tone calibration signal mtone' for estimating power droop and/or phase shift. The example of FIG. 4 illustrates the simplest case in which multi-tone calibration signal mtone is a dual-tone calibration signal having two tones separated by frequency gap Δf. The dual-tone calibration signal may sometimes also be referred to herein as a dual-tone pair or a pair of tones. This example is merely illustrative and, in general, multi-tone calibration signal mtone may include any desired number of two or more tones that are each separated from one or two other tones by frequency gap Δf.

As shown by frequency diagram 126 of FIG. 4, DAC 32 may generate multi-tone calibration signal mtone in a first frequency band 1 (e.g., baseband). DAC 32 may generate multi-tone calibration signal mtone using a tone generator, synthesizer, or other digital circuitry/logic. The tones in multi-tone calibration signal mtone are separated by frequency gap Δf. Mixer 56 may upconvert multi-tone calibration signal mtone to a second frequency band B2 (e.g., in frequency band FB1), as shown by arrow 130. This signal may be provided to mixer 64 and to de-chirp path 48.

Mixer 64 may upconvert multi-tone calibration signal mtone to a third frequency band B3 (e.g., in frequency band FB2), as shown by arrow 132. Frequency gap Δf is preserved after each up-conversion. The multi-tone calibration signal mtone in frequency band B3 may be transmitted by transmit antenna 40TX or loopback path 80. Mixer 72 may down-convert the multi-tone calibration signal mtone from frequency band B3 back to frequency band B2. De-chirp mixer 74 may mix the multi-tone calibration signal mtone in frequency band B2 as received over de-chirp path 48 with the multi-tone calibration signal mtone in frequency band B2 as down-converted by mixer 72 to recover baseband multi-tone calibration signal mtone,' as shown by arrow 136.

As shown by frequency diagram 128 of FIG. 4, baseband multi-tone calibration signal mtone' has an amplitude A1, which is measured by phase and magnitude measurement circuitry 88 and converted to a digital value in digital data dat by ADC 42. The next radio frequency in the sweep of FB2 frequencies may then be used (e.g., during a subsequent iteration of operations 106-110 of FIG. 3). This may produce a multi-tone calibration signal mtone at another frequency in frequency band B3, such as the multi-tone calibration signal mtone represented by dashed arrows 135 in frequency diagram 126. The amplitude of this multi-tone calibration signal may be different than for the previously transmitted multi-tone calibration signal due to the power droop of the system (e.g., as shown by power droop 134). After mixing by de-chirp mixer 74, the resulting baseband multi-tone calibration signal mtone' may have amplitude A2, as shown by dashed arrow 129 in frequency diagram 128. Amplitude A2 may be measured by phase and magnitude measurement circuitry 88 and converted to a digital value in digital data dat by ADC 42.

Amplitude A2 is less than amplitude A1 due to the frequency-dependent power droop imposed by the components of wireless circuitry 24. This may be repeated for each FB2 frequency in the sweep to recover a full estimate of the power droop 134 across operating frequencies as exhibited by wireless circuitry 24. In other words, radar circuitry 26 may shift the generated dual-tones of multi-tone calibration signal mtone along the frequency axis (e.g., by iterating over operations 106-110 of FIG. 3), while maintaining a constant frequency gap Δf, until the operating frequency range of radar circuitry 26 is sufficiently covered or sampled with dual-tones. In general, the finer the shift in radio frequency between each iteration, the more granularly the droop function (e.g., power droop 134) can be estimated. In embodiments where radar circuitry 26 only performs a single upconversion, the sweep over operating frequency may be performed within band B2 without further upconversion to band B3 (e.g., radar circuitry 26 may transmit multi-tone calibration signals across different FB1 frequencies, where power droop 134 is observed within frequency band FB1). Control circuitry 14 may process the stored amplitudes in digital data dat to estimate power droop 134. The phase of each baseband multi-tone calibration signal mtone' may also be estimated if desired to identify any phase shifts imposed by the components of radar circuitry 26.

In scenarios where only a single-tone calibration signal is used, the resulting baseband tone would be recovered at DC in frequency diagram 128, where any measurement of amplitude/phase would be negatively affected by DC noise or LO leakage. However, by generating multi-tone calibration signal mtone with two or more tones separated by frequency gap Δf, the output of the mixing operation performed by de-chirp mixer 74 (baseband multi-tone calibration signal mtone') will be offset in frequency from DC by frequency gap Δf. Frequency gap Δf may therefore be selected such that baseband multi-tone calibration signal mtone' does not overlap with any DC noise, LO leakage, or other baseband system noise. This may allow more accurate measurements of magnitude (e.g., amplitudes A1, A2, etc.) and thus power droop to be gathered than in scenarios where a single tone calibration signal is used, thereby allowing accurate estimates of range R, position, and velocity to be obtained over time.

Figure 5:
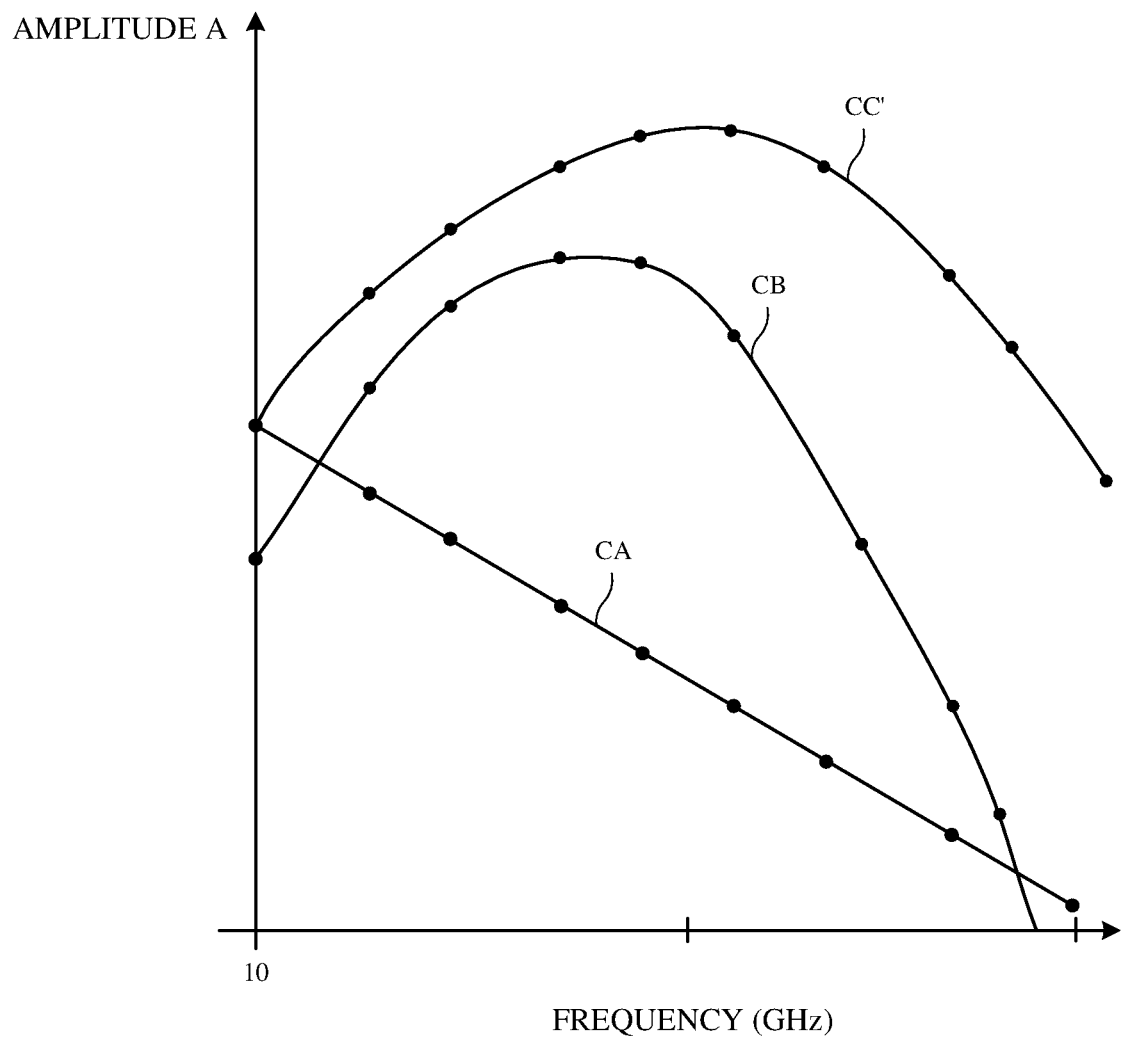
FIG. 5 is a plot of illustrative power droops that may be estimated using a multi-tone calibration signal in accordance with some embodiments.

FIG. 5 is a plot showing three examples of potential power droops that may be estimated by radar circuitry 26 and control circuitry 14 from the magnitude of baseband multi-tone calibration signals mtone' for use in predistorting chirp signals. As shown in FIG. 5, curve CA shows a linear power droop that may be estimated by radar circuitry 26 and control circuitry 14. Curve CC shows a parabolic power droop that may be estimated by radar circuitry 26 and control circuitry 14. Curve CB shows a combination of linear and parabolic power droops that may be estimated by radar circuitry 26 and control circuitry 14. Each point on curves CA, CB, and CC may correspond to a respective radio frequency in the sweep of radio frequencies used in transmitting multi-tone calibration signals mtone. Linear power droops such as that associated with curve CA are often associated with the droop effects of cabling. Parabolic power droops such as that associated with curve CC are often associated with the droop effects of antennas 40TX and 40RX. A combination of linear and parabolic power droops such as that associated with curve CB may represent the combination of the droop effects of cabling and antennas 40TX and 40RX, for example. These examples are merely illustrative and, in practice, the estimated power droop may have other shapes.

In the simplest case where multi-tone calibration signal mtone is a dual-tone calibration signal (e.g., as shown in FIG. 4), the dual-tone pair may be represented as complex tones using equation 1, for example.

$$(k_1 e^{j\omega t} + k_1 e^{j(1+\Delta)\omega t})^* \cdot (k_2 e^{j\omega t} + k_2 e^{j(1+\Delta)\omega t})^* = 2k_1 * k_2 (1 + \cos(\Delta\omega t)) \quad (1)$$

In equation 1, ω is angular frequency, Δ is the frequency gap Δf in units of angular frequency, "*" is the complex conjugate operator, "·" is the dot product operator, t is time, and j is the square root of −1. By performing the operations of FIG. 3, control circuitry 14 may estimate power droop and/or phase shift effects introduced by radar circuitry 26 and thus may estimate complex weight values $k_1$ and $k_2$. Complex weight values $k_1$ and $k_2$ may then be used to form the value that is used to predistort the chirp signals (e.g., the chirp signals may be multiplied by a value such as $1/(k_1 * k_2)$ to predistort the chirp signals, thereby inverting the subsequent power droop and phase shift effects imparted by the components of radar circuitry 26).

In the baseband of transmit chain 52, the dual-tone calibration signal may be represented by one complex tone or two real tones that consist of four symmetric complex tones, as given by equation 2.

$$\cos(\omega t) + \cos((1+\Delta)\omega t) = 0.5((e^{-j\omega t} + e^{j\omega t}) + (e^{-j(1+\Delta)\omega t} + e^{j(1+\Delta)\omega t})) \quad (2)$$

In the FB2 (e.g., RF) domain, the complex tone pairs are frequency-dependent attenuated, where the mixer path is represented by expression 3 and the antenna path is represented by expression 4.

$$((k_1 e^{-j\omega t} k_3 e^{j\omega t}) + (k_1 e^{-j(1+\Delta)\omega t} k_3 e^{j(1+\Delta)\omega t}))8 \quad (3)$$

$$(k_2 e^{-j\omega t} k_4 e^{j\omega t}) + (k_2 e^{-j(1+\Delta)\omega t} k_4 e^{j(1+\Delta)\omega t})8 \quad (4)$$

In the baseband of receive chain 54, after mixing by de-chirp mixer ∝(a process sometimes referred to herein as de-chirping), several mixing products are generated. The ±n·ω mixing products that are 1 GHz are attenuated by LPF 76. The ±Δ·ω mixing products that are less than 20 MHz (e.g., 1 MHz) may be evaluated for estimating the power droop. More generally, one complex tone may be modeled using expression 5, two complex tones may be modeled using expression 6, and four complex tones (e.g., two real tones) may be modeled using expression 7.

$$(1) \cdot (k_1^* k_2) \quad (5)$$

$$\begin{pmatrix} e^{-j\Delta\omega t} \\ 1 \\ e^{j\Delta\omega t} \end{pmatrix}^T \cdot \begin{pmatrix} 1 \\ 2 \\ 1 \end{pmatrix} \cdot (k_2 k_1^*) + \ldots e^{\pm jn\omega t} \quad (6)$$

$$\begin{pmatrix} e^{-j2\Delta\omega t} \\ e^{-j\Delta\omega t} \\ 1 \\ e^{j\Delta\omega t} \\ e^{j2\Delta\omega t} \end{pmatrix}^T \cdot \begin{pmatrix} k_2 k_3^* \\ 2k_2 k_3^* + k_2 k_1^* + k_4 k_3^* \\ 2k_2 k_1^* + 2k_4 k_3^* \\ 2k_4 k_1^* + k_2 k_1^* + k_4 k_3^* \\ k_4 k_1^* \end{pmatrix} + \ldots e^{\pm jn\omega t} \quad (7)$$

In expressions 6 and 7, "T" is the transpose operator and n is an integer index. Expression 6 represents five equations, where two of the equations are linear dependent on the other three. Two parameters of interest, $k_1 * k_2$ (lower frequency) and $k_3 * k_4$ (higher frequency) are simultaneously estimated. IQ-imbalance correction may be performed before droop estimation. Use of two real tones may allow radar circuitry 26 to be produced at a lower manufacturing cost than use of two complex tones. However, the two paths may be separately calibrated when two complex tones are used whereas the two paths may not be separately calibrated when two real tones are used. In order to support generation of two complex tones, the sin/cos tables used to produce multi-tone calibration signal mtone may be doubled in size or may be run at half rate, where the signal is interpolated in I/Q and a complex mix is used to arrive in the appropriate frequency band, as examples.

Figure 6:
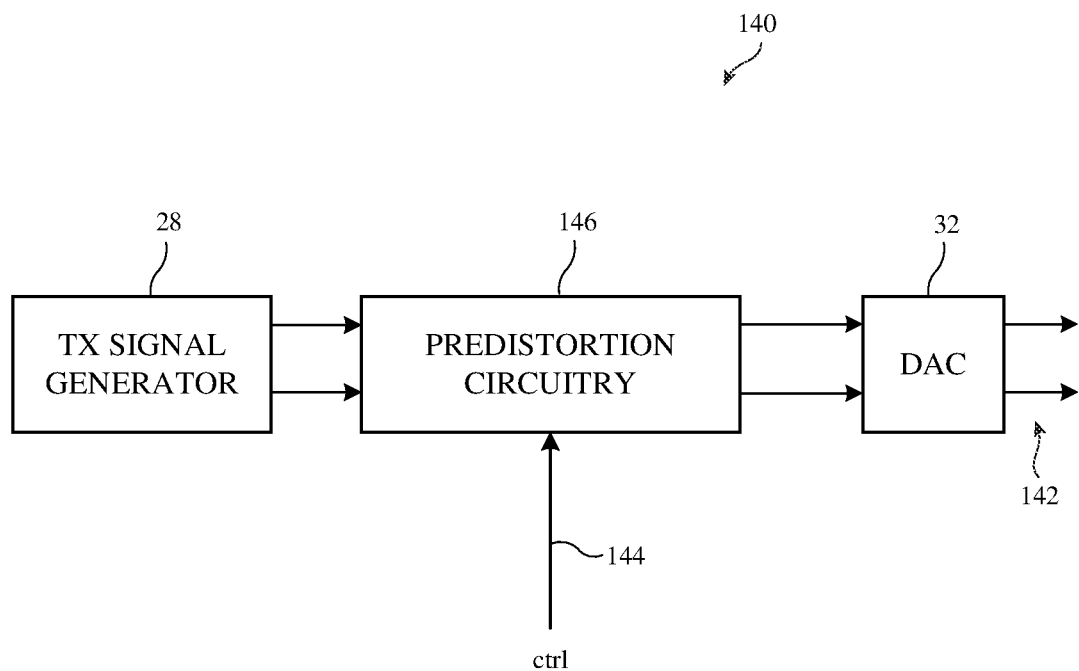
FIG. 6 is a diagram showing how illustrative digital predistortion circuitry may be used to compensate for an estimated power droop and/or phase shift of spatial ranging circuitry in accordance with some embodiments.

The distortion performed by distortion circuitry 30 may be performed in the digital domain or in the analog domain. FIG. 6 is a diagram showing one example of how distortion circuitry 30 may include predistortion circuitry in the digital domain. As shown in FIG. 6, the input of DAC 32 may be coupled to digital circuitry 140. Digital circuitry 140 may include transmit signal generator 28 and predistortion circuitry 146 (e.g., distortion circuitry 30 may include digital predistortion (DPD) circuitry such as predistortion circuitry 146). The input of predistortion circuitry 146 may be coupled to the output of transmit signal generator 28. The output of predistortion circuitry 146 may be coupled to the input of DAC 32. DAC 32 may have an output 142 coupled to mixer 56 (FIG. 2). Predistortion circuitry 146 may have a control path 144 that receives control signals ctrl from control circuitry 14.

Transmit signal generator 28 may generate transmit signals (e.g., chirp signals). Predistortion circuitry 146 may multiply the transmit signals by a value that serves to predistort the transmit signals such that the predistortion in the transmit signals will counteract the estimated power droop, phase shift, and/or any I/Q imbalance imparted by the components of radar circuitry 26. Control signals ctrl may include the values that are used by predistortion circuitry 146 to predistort the chirp signals. As the estimated power droop and/or phase shift changes over time, control signals ctrl may change the values that are used by predistortion circuitry 146 to predistort the transmit signals. DAC 32 may convert the predistorted transmit signals from the digital domain to the analog domain. The example of FIG. 6 is merely illustrative. Other predistortion schemes or architectures may be used. Predistortion circuitry 146 may alternatively be implemented in the analog domain. Distortion circuitry 30 may additionally or alternatively include postdistortion circuitry that operates on received signals to compensate for power droop and phase shift.

In this way, device 10 may perform power droop estimation for the complete radio-frequency bandwidth of radar circuitry 26, even if receive chain 54 does not support the complete radio-frequency bandwidth. At the same time, no direct access to the radio-frequency signals is required for performing the power droop estimation. This may serve to reduce the receive chain bandwidth and therefore lower current consumption in the system. Calibrating radar circuitry 26 using multi-tone calibration signal mtone may allow device 10 to choose the baseband offset frequency (e.g., via selection of frequency gap Δf) to be a system-dependent ideal tone position, such that there is no influence of system impairments, LO noise, etc. on baseband multi-tone calibration signal mtone'. Power droop estimation and compensation may be performed during the final production test of device 10 and/or over the lifetime of device 10 to adapt the droop compensation to any potential aging effects in device 10. In addition, droop tracking and compensation over the lifetime of device 10 may be used to check for changes in the operation of device 10, such as scenarios where a case or cover is attached to device 10, thereby allowing device 10 to adapt system configurations (e.g., gain settings, background cancellation, etc.) accordingly.

Figure 7:
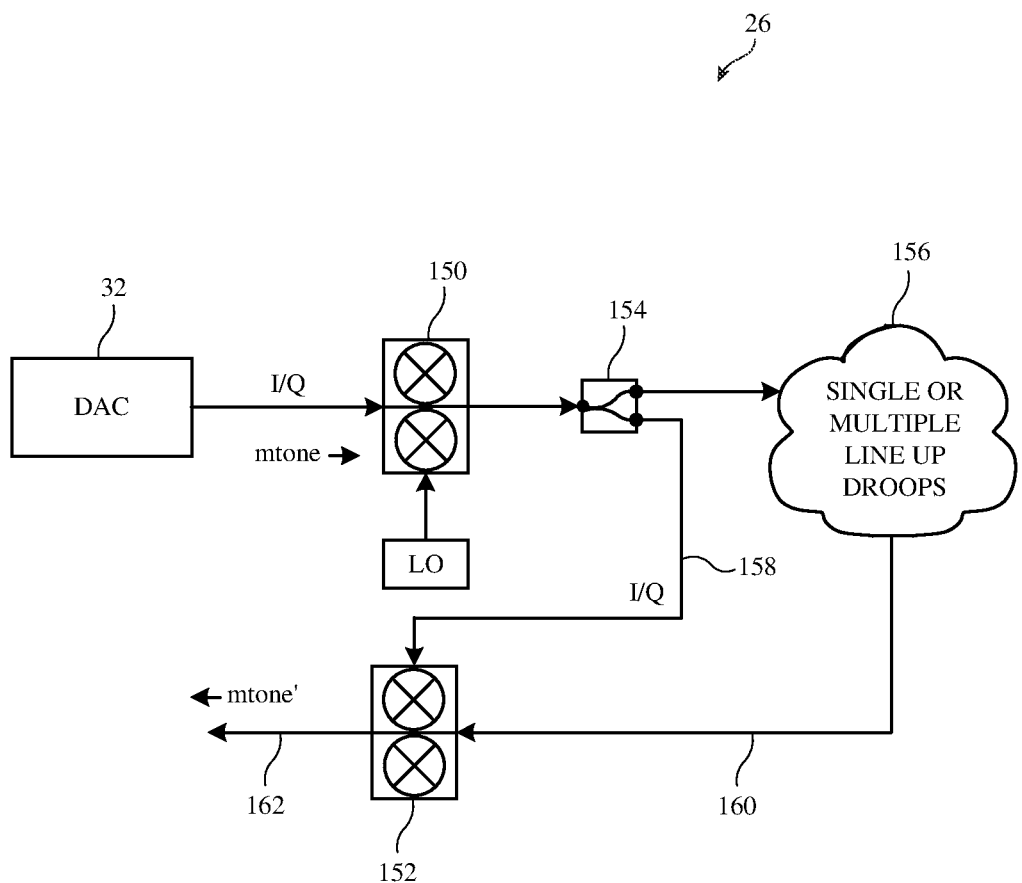
FIG. 7 is a diagram of illustrative spatial ranging circuitry having at least first and second mixers that may be calibrated using a multi-tone calibration signal in accordance with some embodiments.

The example of FIGS. 2-4 in which radar circuitry 26 performs multiple upconversions is merely one illustrative implementation showing how radar circuitry 26 may be calibrated using multi-tone calibration signal mtone. In general, radar circuitry 26 may perform any desired number of one or more upconversions and may include any desired number of two or more mixers. FIG. 7 is a circuit diagram of radar circuitry 26 in an example where radar circuitry 26 performs at least one upconversion and includes at least two mixers.

As shown in FIG. 7, radar circuitry 26 may include a first mixer such as mixer 150 coupled to the output of DAC 32 (e.g., over an I/Q path), a signal splitter such as splitter 154 having an input coupled to the output of mixer 150, a second mixer such as mixer 152 (e.g., a de-chirp mixer) having a first input coupled to a first output of splitter 154 over signal (e.g., de-chirp) path 158, and circuitry 156 (e.g., one or more line up droops) coupled between a second output of splitter 154 and a second input of mixer 152. Other circuit components such as amplifiers, filters, an ADC (e.g., ADC 42 of FIG. 2), or other components may be interposed at any desired locations within radar circuitry 26. Circuitry 156 may include other portions of radar circuitry 26 that introduce power droops and phase shifts to radar circuitry 26 (e.g., antennas, loopback paths, transmission lines, amplifiers, filters, etc.). Circuitry 156 may, for example, include mixers 64 and 72, amplifiers 66 and 70, and antennas 40TX and 40RX in embodiments where radar circuitry 26 performs multiple upconversions as shown in FIG. 2. Circuitry 156 may sometimes be referred to herein as intermediate circuitry.

During spatial ranging operations, DAC 32 may pass transmit signals generated using transmit signal generator 28 (FIG. 2) (e.g., chirp signals) to mixer 150. Mixer 150 may use LO 160 to upconvert the transmit signals to higher frequencies such as frequencies in frequency band FB1 or frequency band FB2 of FIG. 2 (e.g., LO 160 may include FB1LO 50 or FB2LO 46 of FIG. 2). Splitter 154 may pass the up-converted transmit signals to mixer 152 over signal path 158 and to circuitry 156. Circuitry 156 may transmit the up-converted transmit signals (e.g., as radio-frequency signals 36 of FIG. 1) and may receive corresponding reflected signals (e.g., reflected signals 38 of FIG. 1). Circuitry 156 may pass the received reflected signals to mixer 152. Mixer 152 may mix the received signals with the transmit signals received over signal path 158 to produce corresponding baseband signals at output path 162. Control circuitry 14 (FIG. 1) may process the baseband signals and the transmit signals to identify range R, position, and/or velocity for external object 34.

During calibration, DAC 32 may transmit multi-tone calibration signal mtone. Mixer 150 may up-convert the multi-tone calibration signal. Splitter 154 may transmit the up-converted multi-tone calibration signal to mixer 152 over signal path 158 and to circuitry 156. Circuitry 156 may transmit the up-converted multi-tone calibration signal (e.g., in a closed loop over the air or over a loop back path), which is then received at mixer 152. Mixer 152 may mix the up-converted multi-tone calibration signals received over signal path 158 with the up-converted multi-tone calibration signals received from circuitry 156 to produce baseband multitone calibration signal mtone'. Control circuitry 14 may repeat this process while sweeping mixer 150 over different frequencies (e.g., the frequencies of operation of radar circuitry 26). Control circuitry 14 may use the baseband multitone calibration signals produced by mixer 152 to estimate the power droop and/or phase shifts of circuitry 156. Control circuitry 14 may then use distortion circuitry 30 (FIG. 1) to distort subsequently transmitted signals to mitigate the power droop and phase shifts of circuitry 156. In other words, radar circuitry 26 of FIG. 7 may be calibrated using multi-tone calibration signals mtone according to the operations of FIG. 3 (e.g., in embodiments where radar circuitry 26 only performs a single upconversion, an FB1 frequency may be selected at operation 104 of FIG. 3 instead of an FB2 frequency, the upconversion at operation 106 may be omitted, FB1 frequencies may be processed in determining whether to proceed along paths 112 or 118, and a new FB1 frequency may be selected at operation 114).

The methods and operations described above in connection with FIGS. 1-7 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry. The components of FIGS. 2, 6, and 7 may be implemented using hardware (e.g., circuit components, digital logic gates, etc.) and/or using software where applicable.

The foregoing is merely illustrative and various modifications can be made to the described embodiments. The foregoing embodiments may be implemented individually or in any combination.

What is claimed is:

1. Wireless communication circuitry for performing spatial ranging operations on an external object using transmit signals, the wireless communication circuitry comprising:
   a digital-to-analog converter (DAC) configured to generate a multi-tone calibration signal having a first tone and a second tone separated from the first tone by a frequency gap;
   a first mixer configured to upconvert the multi-tone calibration signal from a first frequency band to a second frequency band;
   a second mixer having a first input configured to receive the multi-tone calibration signal in the second frequency band via a signal path from an output of the first mixer, and having a second input configured to receive the multi-tone calibration signal in the second frequency band via intermediate circuitry communicatively coupled between the output of the first mixer and the second input, wherein the second mixer is configured to generate a baseband multi-tone calibration signal;

measurement circuitry configured to measure a magnitude of the baseband multi-tone calibration signal; and control circuitry configured to
estimate a power droop of the intermediate circuitry based on the magnitude measured by the measurement circuitry and
distort the transmit signals based on the estimated power droop.

2. The wireless communication circuitry of claim 1 wherein the transmit signals comprise chirp signals and the signal path comprises a de-chirp path, the wireless communication circuitry further comprising:
a chirp generator configured to generate the chirp signals for transmission by a transmit antenna, wherein the first mixer is configured to upconvert the chirp signals to the second frequency band, the first input of the second mixer is configured to receive the chirp signals in the second frequency band via the de-chirp path, and the second input is configured to receive a reflected version of the chirp signals via a receive antenna.

3. The wireless communication circuitry of claim 1, further comprising:
a signal splitter having an input coupled to the output of the first mixer, a first output coupled to the intermediate circuitry, and a second output coupled to the first input of the second mixer over the signal path.

4. The wireless communication circuitry of claim 3, wherein the intermediate circuitry comprises:
a third mixer communicatively coupled to the first output of the signal splitter and configured to upconvert the multi-tone calibration signal from the second frequency band to a third frequency band; and
a fourth mixer communicatively coupled to the second input and configured to downconvert the multi-tone calibration signal from the third frequency band to the second frequency band.

5. The wireless communication circuitry of claim 4, wherein the first frequency band comprises a baseband frequency, the second frequency band comprises frequencies greater than the baseband frequency and less than 10 GHz, and the third frequency band comprises frequencies greater than the second frequency band.

6. The wireless communication circuitry of claim 5, wherein the second frequency band comprises frequencies greater than 20 GHz.

7. The wireless communication circuitry of claim 4 wherein the intermediate circuitry comprises:
a transmit antenna communicatively coupled to an output of the third mixer and configured to transmit the multi-tone calibration signal in the third frequency band; and
a receive antenna communicatively coupled to an input of the fourth mixer and configured to receive the multi-tone calibration signal in the third frequency band transmitted by the transmit antenna.

8. The wireless communication circuitry of claim 4, wherein the intermediate circuitry comprises a loopback path communicatively coupled between an output of the third mixer and an input of the fourth mixer, the loopback path being configured to convey the multi-tone calibration signal in the third frequency band.

9. The wireless communication circuitry of claim 1, wherein the wireless communication circuitry comprises digital predistortion circuitry communicatively coupled to an input of the DAC.

10. The wireless communication circuitry of claim 1, wherein the measurement circuitry is configured to measure a phase of the baseband multi-tone calibration signal, the control circuitry is configured to estimate a phase shift of the intermediate circuitry based on the phase measured by the measurement circuitry, and the control circuitry is configured to distort the transmit signals based on the phase shift estimated by the measurement circuitry.

11. The wireless communication circuitry of claim 1, wherein the control circuitry is configured to control the first mixer to sweep over a plurality of radio frequencies, the second mixer is configured to generate the baseband multi-tone calibration signal for each of the radio frequencies in the plurality of radio frequencies, the measurement circuitry is configured to measure the magnitude of the baseband multi-tone calibration signal for each of the radio frequencies in the plurality of radio frequencies, and the control circuitry is configured to estimate the power droop of the intermediate circuitry across each of the radio frequencies in the plurality of radio frequencies.

12. The wireless communication circuitry of claim 1, wherein the baseband multi-tone calibration signal is separated from a direct current (DC) frequency by the frequency gap and the frequency gap is less than or equal to 20 MHz.

13. A method for calibrating radar circuitry, the method comprising:
with a digital-to-analog converter (DAC) in a transmit chain of the radar circuitry, generating a multi-tone calibration signal having a first tone and a second tone separated from the first tone by a frequency gap of less than 20 MHz;
with a first mixer in the transmit chain, upconverting the multi-tone calibration signal from baseband to a first frequency band;
with a second mixer in the transmit chain, upconverting the multi-tone calibration signal from the first frequency band to a second frequency band;
with a third mixer in a receive chain of the radar circuitry, downconverting the multi-tone calibration signal upconverted by the second mixer from the second frequency band to the first frequency band;
with a de-chirp mixer in the receive chain, generating a baseband multi-tone calibration signal by mixing the multi-tone calibration signal upconverted by the first mixer with the multi-tone calibration signal downconverted by the third mixer, the baseband multi-tone calibration signal being separated from a direct current (DC) frequency by the frequency gap;
with control circuitry, estimating a power droop and phase shift of the radar circuitry based on the baseband multi-tone calibration signal generated by the de-chirp mixer; and
with predistortion circuitry in the transmit chain, predistorting chirp signals transmitted over the transmit chain based on the power droop and phase shift estimated by the control circuitry.

14. The method of claim 13, further comprising:
with the second mixer, sweeping the second frequency band over a plurality of radio frequencies;
with the third mixer, downconverting the multi-tone calibration signal for each of the radio frequencies in the plurality of radio frequencies;

with the de-chirp mixer, generating the baseband multi-tone calibration signal for each of the radio frequencies in the plurality of radio frequencies; and with the control circuitry, estimating the power droop of the radar circuitry based on the baseband multi-tone calibration signal generated by the de-chirp mixer for each of the radio frequencies in the plurality of radio frequencies.

15. The method of claim 14, further comprising:

with a low pass filter, low-pass filtering the baseband multi-tone calibration signal for each of the radio frequencies in the plurality of radio frequencies;

with measurement circuitry, measuring a magnitude and a phase of the baseband multi-tone calibration signal for each of the radio frequencies in the plurality of radio frequencies;

with an analog-to-digital converter (ADC), converting the magnitudes and the phases measured by the measurement circuitry into digital data;

with the control circuitry, storing the digital data; and with the control circuitry, estimating the power droop based on the stored digital data.

16. The method of claim 13, wherein predistorting the chirp signals comprises multiplying the chirp signals by a factor that is selected to invert, upon transmission of the chirp signals through the transmit chain, the power droop estimated by the control circuitry.

17. The method of claim 13, further comprising:

with the transmit chain, transmitting the multi-tone calibration signal in the second frequency band using a transmit antenna; and with the third mixer, receiving the multi-tone calibration signal in the second frequency band using a receive antenna.

18. An electronic device comprising:

a first antenna;

a second antenna;

radar circuitry configured to generate transmit signals that are transmitted using the first antenna, the second antenna being configured to receive a reflected version of the transmit signals transmitted using the first antenna;

control circuitry configured to perform spatial ranging operations based on the reflected version of the transmit signals received using the second antenna; and a digital-to-analog converter (DAC) in the radar circuitry, wherein the DAC is configured to generate a multi-tone calibration signal that is transmitted using the first antenna, the multi-tone calibration signal has at least a first tone and a second tone separated from the first tone by a frequency gap of less than 20 MHz, the control circuitry is configured to estimate a power droop of the radar circuitry using the multi-tone calibration signal, and the control circuitry is configured to distort the transmit signals based on the estimated power droop.

19. The electronic device of claim 18, wherein the DAC is configured to convert the transmit signals from a digital domain to an analog domain.

20. The electronic device of claim 18, wherein the multi-tone calibration signal has a third tone that is separated from the second tone by the frequency gap and a fourth tone that is separated from the third tone by the frequency gap.

* * * * *